United States Patent
Yang (10) Patent No.: US 9,100,626 B2
(45) Date of Patent: Aug. 4, 2015

(54) VIDEO PROCESSING APPARATUS AND CONTROL METHOD THEREOF

(75) Inventor: Sun-ho Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1181 days.

(21) Appl. No.: 12/273,848

(22) Filed: Nov. 19, 2008

(65) Prior Publication Data

US 2009/0141181 A1 Jun. 4, 2009

(30) Foreign Application Priority Data

Nov. 29, 2007 (KR) .................... 10-2007-0122733

(51) Int. Cl.
*H04N 5/63* (2006.01)
*H04N 21/40* (2011.01)
*H04N 5/44* (2011.01)

(52) U.S. Cl.
CPC ............... *H04N 5/63* (2013.01); *H04N 21/40* (2013.01); *H04N 5/4401* (2013.01)

(58) Field of Classification Search
USPC ..................................................... 348/730
See application file for complete search history.

(56) References Cited

U.S. PATENT DOCUMENTS

| | | | |
|---|---|---|---|
| 6,591,314 B1* | 7/2003 | Colbath | 710/36 |
| 2005/0073518 A1* | 4/2005 | Bontempi | 345/211 |
| 2007/0152994 A1* | 7/2007 | Koh | 345/211 |
| 2008/0051027 A1* | 2/2008 | Lee | 455/3.06 |
| 2009/0064252 A1* | 3/2009 | Howarter et al. | 725/114 |

FOREIGN PATENT DOCUMENTS

| | | | | |
|---|---|---|---|---|
| EP | 1 189 436 | * | 3/2002 | H04N 5/63 |
| EP | 1189436 A1 | | 3/2002 | |
| EP | 1806918 A2 | | 7/2007 | |
| GB | 2357022 A | | 6/2001 | |
| KR | 2001-0011565 A | | 2/2001 | |
| KR | 10-2005-0115615 A | | 12/2005 | |

OTHER PUBLICATIONS

HDMI 1.3a specification, Nov. 10, 2006.*
Communication dated Mar. 25, 2013 issued by the Korean Intellectual Property Office in counterpart Korean Patent Application No. 10-2007-0122733.

* cited by examiner

*Primary Examiner* — Michael Teitelbaum
(74) *Attorney, Agent, or Firm* — Sughrue Mion, PLLC

(57) ABSTRACT

A video processing apparatus and a control method thereof are provided. The video processing apparatus includes: a signal receiving unit which receives a signal from an external video processing apparatus; a video processing unit which processes the signal received by the signal receiving unit; and a controller which supplies or cuts off electric power to the video processing unit according to whether the signal is received by the signal receiving unit.

14 Claims, 5 Drawing Sheets

VIDEO PROCESSING APPARATUS AND CONTROL METHOD THEREOF

CROSS-REFERENCE TO RELATED PATENT APPLICATION

This application claims priority from Korean Patent Application No. 10-2007-0122733, filed on Nov. 29, 2007 in the Korean Intellectual Property Office, the disclosure of which is incorporated herein in its entirety by reference.

BACKGROUND OF THE INVENTION

1. Field of Invention

Apparatuses and methods consistent with the present invention relate to a video processing apparatus which is improved by a control mechanism for turning on/off power supplied to the video processing apparatus, and a control method thereof 2. Description of Related Art In general, a video processing apparatus receives and processes a video signal including video information, and may be classified into various types according to its functions. For example, video processing apparatuses may be classified as a display apparatus (e.g., a television which includes a display unit such as a liquid crystal display (LCD) or a plasma display panel (PDP), a set-top box for processing a video signal and providing it for such a display apparatus, a digital versatile disk (DVD) player for generating a video signal, a video player, and the like).

Such video processing apparatuses may be connected to each other to communicate a video signal and provide a video for a user. In the case of such a plurality of video processing apparatuses connected to each other, the video processing apparatuses should be individually manipulated to turn on or off power of the respective video processing apparatuses.

To decrease the above inconvenience, there is provided a method that if power of a first video processing apparatus among the plurality of video processing apparatuses is turned on or off, a signal including information thereon is transmitted to a second video processing apparatus to turn on or off power of the second video processing apparatus.

However, in order to include the information on the turning on/off of power of the first video processing apparatus in the signal to be transmitted to the second video processing apparatus, the information should be mixed with a video signal and then decoded in the second video processing apparatus, or a separate control signal including the information should be generated.

Further, in order to turn on power of the second video processing apparatus after power of the first video processing apparatus is turned on in the state that power of both the first and second video processing apparatuses is turned off, some elements for signal receiving and decoding should be supplied with electric power even in the state that power of the second video processing apparatus is turned off.

Furthermore, in the case that a physical distance between the video processing apparatuses is long, a signal is likely to be distorted during transmission, and thus, the physical distance should be within a predetermined range, for example, 20 meters.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

Exemplary embodiments of the present invention provide a video processing apparatus which can convert a power state of one of a plurality of video processing apparatuses according to conversion of a power state of another of the plurality of video processing apparatuses without a control signal including information on the power state, and a control method thereof Exemplary embodiments of present invention also provide a video processing apparatus which can accomplish the above power state change even in the case that a physical distance between the plurality of video processing apparatuses is long, and a control method thereof Additional aspects of the present invention will be set forth in part in the description which follows and, in part, will be obvious from the description, or may be learned by practice of the present invention.

According to an aspect of the present invention, there is provided a video processing apparatus including: a signal receiving unit which receives a signal from an external video processing apparatus; a video processing unit which processes the signal received to the signal receiving unit; and a controller which selectively supplies or cuts off electric power to the video processing unit according to whether the signal is received to the signal receiving unit.

The controller may supply the electric power to the video processing unit if the signal is received to the signal receiving unit and cut off the electric power to the video processing unit if the signal is not received to the signal receiving unit.

The external video processing apparatus may be one of a plurality of external video processing apparatuses communicably linked to the video processing apparatus.

The signal receiving unit may receive signals from the plurality of external video processing apparatuses respectively, and if the signal receiving unit receives the signal from the external video processing apparatus of the plurality of external video processing apparatuses, the controller may selectively supply or cut off the electric power to the video processing unit according to a predetermined selection corresponding to the external video processing apparatus.

The video processing apparatus may further include an input unit through which the predetermined selection is made by a user.

The video processing apparatus may further include a display unit which displays video information if the signal includes the video information, and the controller may supply or cut off electric power to the display unit according to whether the signal receiving unit receives the signal.

The controller may determine whether the signal includes identification information for identifying the external video processing apparatus and selectively supply or cut off the electric power to the video processing unit according to a result of the determination of whether the signal includes the identification information.

The signal may include a light signal.

The video processing apparatus may further include an interface unit which receives the light signal, converts the light signal into a signal format supported by the signal receiving unit, and transmits the converted signal to the signal receiving unit.

According to another aspect of the present invention, there is provided a method of controlling supply power in a video processing apparatus including a video processing unit which processes a signal received from an external video processing apparatus. The method includes: determining whether the signal is received from the external video processing apparatus; and selectively supplying or cutting off electric power to the video processing unit according to a result of determining whether the signal is received from the external video processing apparatus.

The selectively supplying or cutting off the electric power to the video processing unit may include supplying the electric power to the video processing unit if it is determined that the signal is received and cutting off the electric power to the video processing unit if it is determined that the signal is not received.

The selectively supplying or cutting off the electric power to the video processing unit may further include supplying the electric power to the video processing unit if the signal is received from external video processing apparatus of the plurality of external video processing apparatuses according to a predetermined selection corresponding to the external video processing apparatus.

Before the electric power to the video processing unit is not cut off, the video processing method may further include selecting cutting off the electric power to the video processing unit if one of the signals is not received.

The selectively supplying or cutting off the electric power to the video processing unit may further include selectively supplying or cutting off electric power to a display unit of the video processing apparatus which displays video information included in the signal according to a result of determining whether the signal is received from the external video processing apparatus.

The supplying or cutting off the electric power to the video processing unit may include: determining whether the signal includes identification information for identifying the external video processing apparatus of the plurality of video processing apparatuses and selectively supplying or cutting off the electric power to the video processing unit according to a result of the determining whether the signal including the identification information is received.

The signal may include a light signal.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

Figure 1:
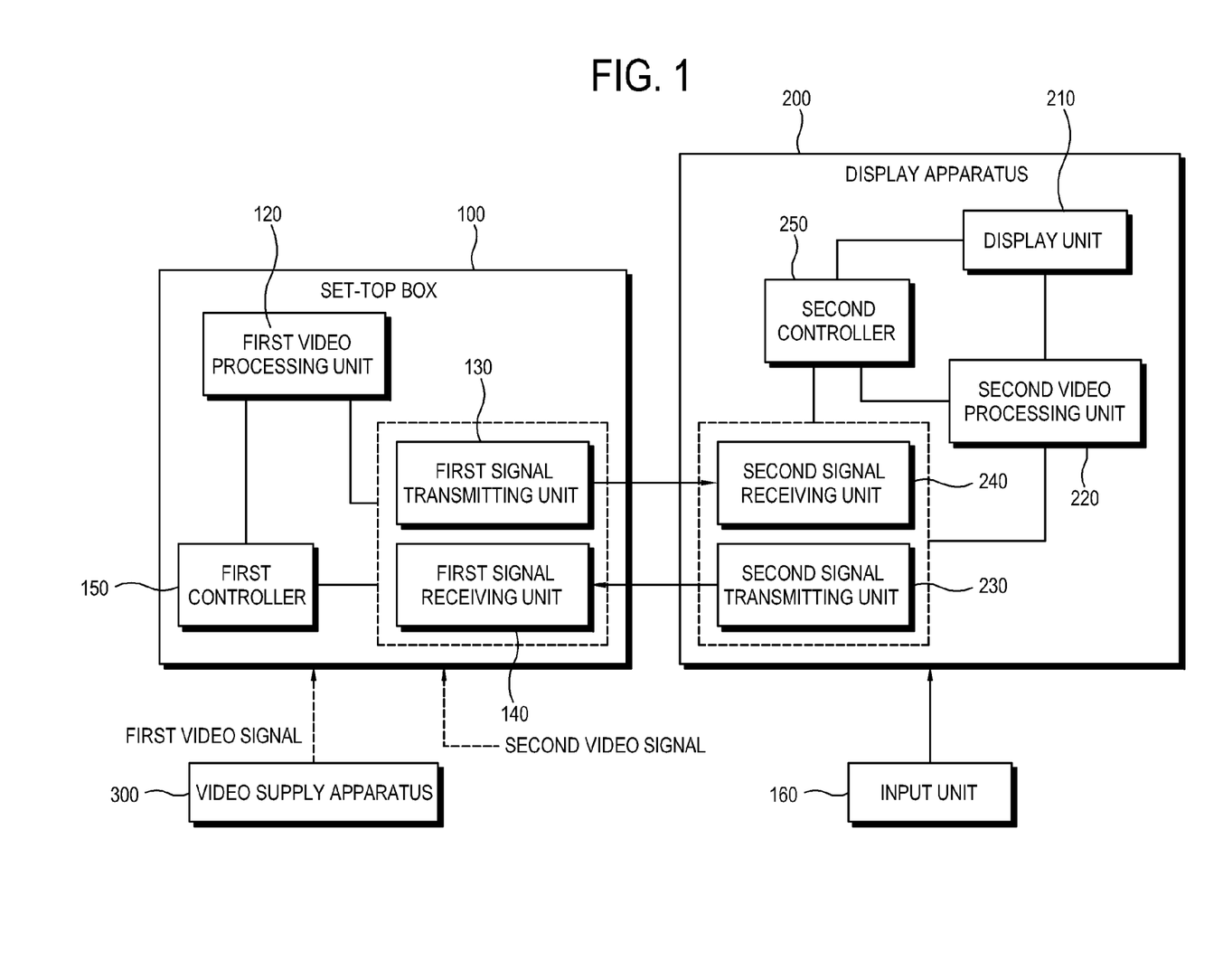
FIG. 1 is a control block diagram illustrating a video processing apparatus according to a first exemplary embodiment of the present invention.

Referring to FIG. 1, a video processing apparatus according to a first exemplary embodiment of the present invention may include a set-top box 100 which receives and processes at least one video signal; and a display apparatus 200 which displays the processed video signal as a video, by way of example. The video processing apparatuses according to the present embodiment may further include a video supply apparatus 300 which is connected to the set-top box 100 and provides the video signal to the set-top box 100.

The set-top box 100 includes a first video processing unit 120 which processes the received video signal, a first signal transmitting unit 130 which transmits the processed video signal, a first signal receiving unit 140 which receives a signal transmitted from the display apparatus 200, and a first controller 150 which controls the above components.

The first video processing unit 120 processes a video signal received by the set-top box 100 through various paths, for example, a broadcast signal transmitted by a broadcasting station, a video signal provided by a video cassette recorder (VCR), a video signal provided by a DVD player, or the like. The first video processing unit 120 is provided with a decoder for decoding and processing the video signal in accordance with characteristics of the type of the video signal.

The first signal transmitting unit 130 transmits the video signal processed in the first video processing unit 120 to the display apparatus 200 so that the video signal can be displayed as a video. Here, the first signal transmitting unit 130 may process and transmit the video signal as a light signal. In this case, the first signal transmitting unit 130 may include a light signal processing unit (not shown).

In the case that the light signal is used for signal transmission between the set-top box 100 and the display apparatus 200, it is possible to minimize distortion of video information transmitted to the display apparatus 200, and to increase the physical distance between the set-top box 100 and the display apparatus 200, for example, to 200 meters or more.

The light signal may be transmitted from the first signal transmitting unit 130 to the display apparatus 200, for example, by an optical fiber cable.

The first signal receiving unit 140 receives a light signal transmitted by the display apparatus 200. The light signal transmitted by the display apparatus 200 is different from the light signal transmitted by the first signal transmitting unit 130 and does not include video information. The light signal transmitted by the first signal transmitting unit 130 may or may not include the video information processed by the first video processing unit 120, as necessary.

The signal receiving unit 140 is supplied with electric power even when the power of the set-top box 100 is turned off, and detects that the light signal from the display apparatus 200 is received or cut off The detection is monitored by the first controller 150.

The first controller 150 controls operation of the components of the set-top box 100. Particularly, the first controller 150 controls supply or cut-off of electric power to the components. The power state is changed in two cases.

The first case is the case that the power state of the set-top box 100 is input by a user. The first controller 150 turns on or off power of the set-top box 100 on the basis on a signal input through an input unit which is manipulated by a user, for example, a menu key provided on an external part of the set-top box 100 or a remote controller.

The second case is the case that the first controller 150 monitors whether the light signal is received by the first signal receiving unit 140 and controls power of the set-top box 100 based on the result. If the light signal is received by the first signal receiving unit 140, the first controller 150 determines that power of the display apparatus 200 is turned on and turns on power of the set-top box 100. Contrarily, if the light signal is not received by the first signal receiving unit 140, the first controller 150 determines that power of the display apparatus 200 is turned off and turns off power of the set-top box 100.

If power of the set-top box 100 is turned off, that is, if electric power supplied to the first video processing unit 120 and the first signal transmitting unit 130 is cut off, the first controller 150 maintains supply of electric power to the first signal receiving unit 140. Accordingly, it is possible to detect receiving of the light signal to the first signal receiving unit 140.

The display apparatus 200 processes video information transmitted as the light signal from the set-top box 100 and displays the processed video information.

The display apparatus 200 includes a display unit 210 such as an LCD, a CRT, a PDP or the like, a second video processing unit 220 which processes a video signal transmitted from the set-top box 100 and displays the processed video signal on the display unit 210, a second signal receiving unit 240 which receives a light signal transmitted from the set-top box 100, and a second controller 250 which controls operation of the above components.

Here, a separate signal processing unit (not shown) may be provided to process the light signal received by the second signal receiving unit 240 in the second video processing unit 220.

If the light signal received from the second signal receiving unit 240 is decoded into a video signal which can be processed by the second video processing unit 220, the second video processing unit 220 processes the video signal to be displayed on the display unit 210.

The second signal transmitting unit 230 transmits a light signal to the set-top box 100 when power of the display apparatus 200 is turned on. According to the present embodiment, the light signal may not include information on a power state of the display apparatus 200. This is because the second signal transmitting unit 230 can transmit the light signal to the set-top box 100 when the power of the display apparatus 200 is turned on, more specifically, when electric power is supplied to the second signal transmitting unit 230, and accordingly, as the light signal is received or cut off by the first signal receiving unit 140 in the set-top box 100, the first controller 150 can detect a power state of the display apparatus 200.

Methods for transmitting the light signal from the second signal transmitting unit 230 to the set-top box 100 are well know by those of ordinary skill in the art. For example, the light signal can be transmitted or received through a fiber optic cable.

The second signal receiving unit 240 receives a light signal transmitted by the first signal transmitting unit 130 and transmits the light signal to the second video processing unit 220. Here, if the power of the display apparatus 200 is turned off, electric power is supplied to the second signal receiving unit 240. Accordingly, the second signal receiving unit 240 can receive the light signal from the set-top box 100, which may be monitored by the second controller 250.

The second controller 250 controls operation of components of the display apparatus 200 and supplies or cut off electric power to the respective components. The second controller 250 turns on or off the power of the display apparatus 200 as a user designates conversion of a power state through manipulation of a menu key (not shown) installed on an external part of the display apparatus 200 or a remote controller.

Also, the second controller 250 monitors whether the second signal receiving unit 240 receives the light signal from the first signal transmitting unit 130 and controls electric power supply to the display apparatus 200 on the basis of the result. The above control method of the second controller 250 is similar to that of the first controller 150. That is, if a light signal is received by the second signal receiving unit 240, the power of the display apparatus 200 is turned on; and if the reception of the light signal by the second signal receiving unit 240 is cut off, it is determined that the power of the set-top box 100 is turned off, and accordingly, the power of the display apparatus 200 is turned off Here, if the power of the display apparatus 200 is turned off, the second controller 250 maintains the supply of electric power to the second signal receiving unit 240. Accordingly, even if the power of the display apparatus 200 is turned off, the second signal receiving unit 240 can receive the light signal transmitted by the first signal transmission unit 130 when the power of the set-top box 100 is turned on.

Hereinafter, a power state control method of the video processing apparatuses 100 and 200 according to the first exemplary embodiment of the present invention will be described referring to FIGS. 1 to 3. Here, a converting process of the power state of the set-top box 100 when a user turns on or off the display apparatus 200 will be described, by way of example. Similarly, the power state of the display apparatus 200 may be converted according to conversion of the power state of the set-top box 100.

First, the case that a user turns on the display apparatus 200 in the state that the power of both the set-top box 100 and the display apparatus 200 are turned off, will be described referring to FIGS. 1 and 2.

Figure 2:
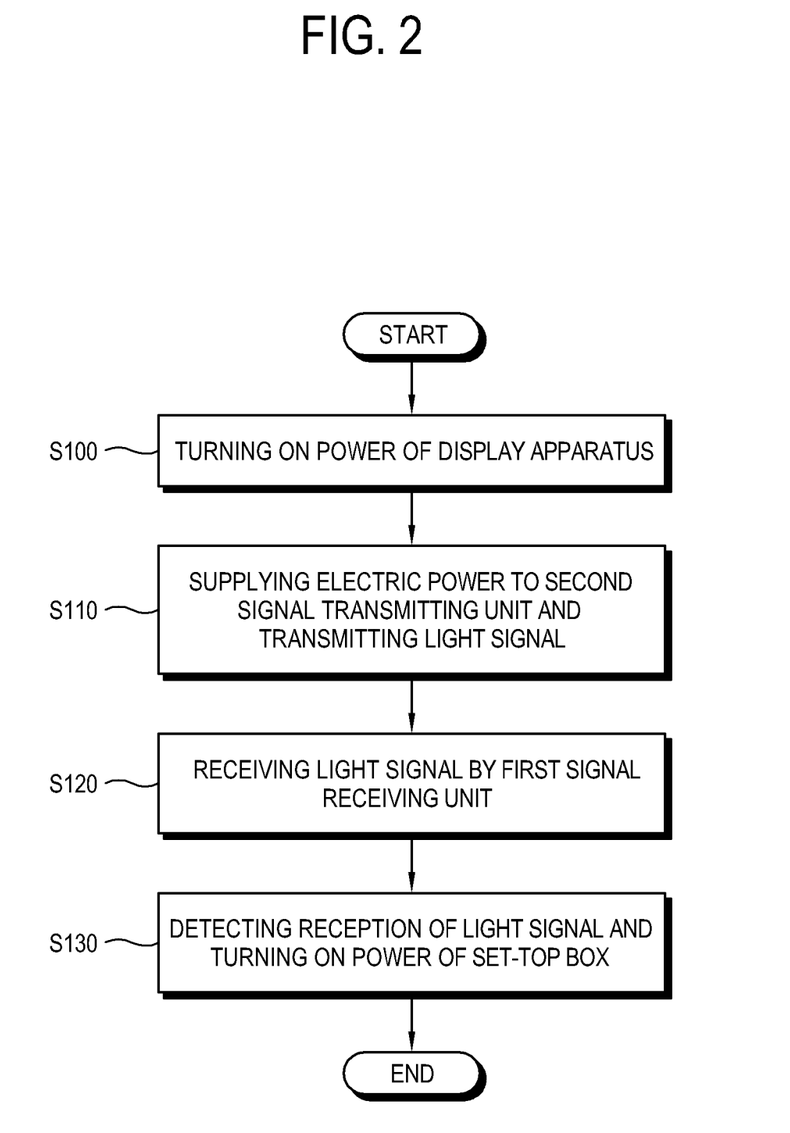
FIG. 2 is a flowchart illustrating a process in which power of a set-top box is turned on according to turning on of power of a display apparatus in the video processing apparatus in FIG. 1.

As shown in FIGS. 1 and 2, in the state that the power of both the set-top box 100 and the display apparatus 200 are turned off in an initial state, a user turns on the power of the display apparatus 200 (S100).

The second controller 250 begins to supply electric power to the display unit 210, the second video processing unit 220 and the second signal transmitting unit 230, and a light signal is transmitted by the second signal transmitting unit 230 (S110).

The light signal is received by the first signal receiving unit 140 (S120). Here, the first signal receiving unit 140 can receive the light signal because it is being supplied with electric power. The first controller 150 monitors reception of the light signal by the first signal receiving unit 140. If the reception of the light signal is detected, the first controller 150 determines that the power of the display apparatus 200 is turned on and turns on the power of the set-top box 100 (S130). The first controller 150 supplies electric power to the first video processing unit 120 and the first signal transmitting unit 130.

Second, the case that a user turns off the display apparatus 200 in the state that the power of both the set-top box 100 and the display apparatus 200 are turned on will be described referring to FIGS. 1 and 3.

Figure 3:
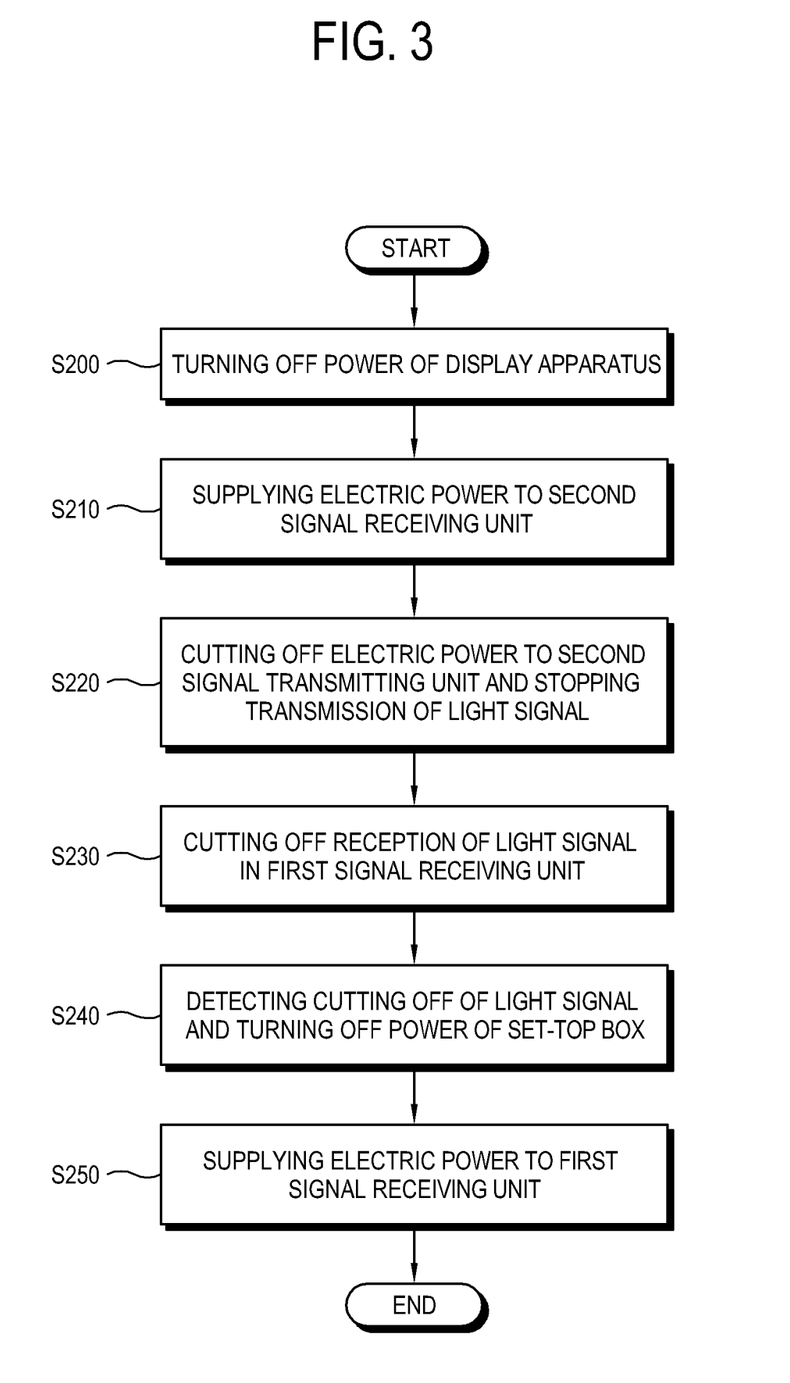
FIG. 3 is a flowchart illustrating a process in which power of a set-top box is turned off according to turning off of power of a display apparatus in the video processing apparatus in FIG. 1.

As shown in FIGS. 1 and 3, in an initial state that the power of both the set-top box 100 and the display apparatus 200 is turned on, a user turns off the power of the display apparatus 200 (S200).

The second controller 250 cuts off supply of electric power to the display unit 210, the second video processing unit 220 and the second signal transmitting unit 230 while maintaining supply of electric power to the second signal receiving unit 240 (S210).

If electric power is cut off to the second signal transmitting unit 230, transmission of the light signal to the set-top box 100 is stopped (S220), and accordingly, reception of the light signal by the first signal receiving unit 140 is cut off (S230).

The first controller 150 detects the cut-off of the light signal to the first signal receiving unit 140 and determines that the power of the display apparatus 200 is turned off and turns off the power of the set-top box 100 (S240).

Here, the first controller 150 maintains supply of electric power to the first signal receiving unit 140 in order to receive the light signal when the light signal is subsequently transmitted from the display apparatus 200 (S250).

As described above, if the power state of one of the set-top box 100 and the display apparatus 200 is converted by a user, the power state of the other one of the set-top box 100 and the display apparatus 200 can be correspondently converted. At this time, the determining of the power state is based on reception and cut-off of the light signal.

Meanwhile, as described above, the video processing apparatuses according to an exemplary embodiment of the present invention may further include at least one video supplying apparatus 300 which is connected to the set-top box 100 and supplies a video signal. The video supplying apparatus 300 may be provided as various known devices such as a DVD player or the like for generating and transmitting a video signal.

As shown in FIG. 1, the set-top box 100 may receive a video signal through a separate video signal supply (not shown), besides the video signal transmitted from the video supply apparatus 300. For example, the set-top box 100 may receive a video signal transmitted from a broadcasting station through an airwave antenna (not shown) or a cable (not shown).

The video supply apparatus 300 is locally connected to the set-top box 100 and processes video information stored in a recoding medium such as a DVD or the like and supplies the processed video information to the set-top box 100. Here, as described above, the video supply apparatus 300 and the set-top box 100 may communicate via the light signal. In this case, the set-top box 100 further includes a separate element for communicating with the video supply apparatus 300 via the light signal.

Here, a video signal transmitted from the video supply apparatus 300 will be referred to as a first video signal, and a video signal which is different from the first video signal as a second video signal. Further, for the convenience of description, it will be assumed that the first video signal is a DVD video signal and the second video signal is a broadcast signal transmitted from a broadcasting station. A mode in which the second video signal is processed by the set-top box 100 and displayed by the display apparatus 200 will be referred to as a broadcasting mode, by way of example.

Hereinafter, a process that the power of both the set-top box 100 and the display apparatus 200 are turned off or converted into the broadcasting mode when a user turns off the power of the video supply apparatus 300 will be described referring to FIGS. 1 and 4.

Here, in an initial state, the power of the video supply apparatus 300, the set-top box 100 and the display apparatus 200 are turned on and the set-top box 100 receives the first video signal from the video supply apparatus 300 and the second video signal from the broadcasting station. In this initial state, the first controller 150 controls the first video processing unit 120 to process the first video signal and controls the first signal transmitting unit 130 to transmit the process first video signal to the display apparatus 200.

Here, a user may previously select an operation state when the power of the video supply apparatus 300 is turned off For this purpose, an input unit 160 may be further provided to select turning off the power of the set-top box 100 and the display apparatus 200 or performing the broadcasting mode without turning off the power when the first video signal is not received by the set-top box 100.

In FIG. 1, the input unit 160 is connected to the display apparatus 200, but alternatively, the input unit 160 may be connected to the set-top box 100 and transmit the selected information to the first controller 150.

The second controller 250 may include a user interface (UI) selecting unit (not shown) for displaying user's selection through the input unit 160 on the display unit 200 and may transmit the user's selection to the set-top box 100. The first controller 150 stores the transmitted user's selection.

Figure 4:
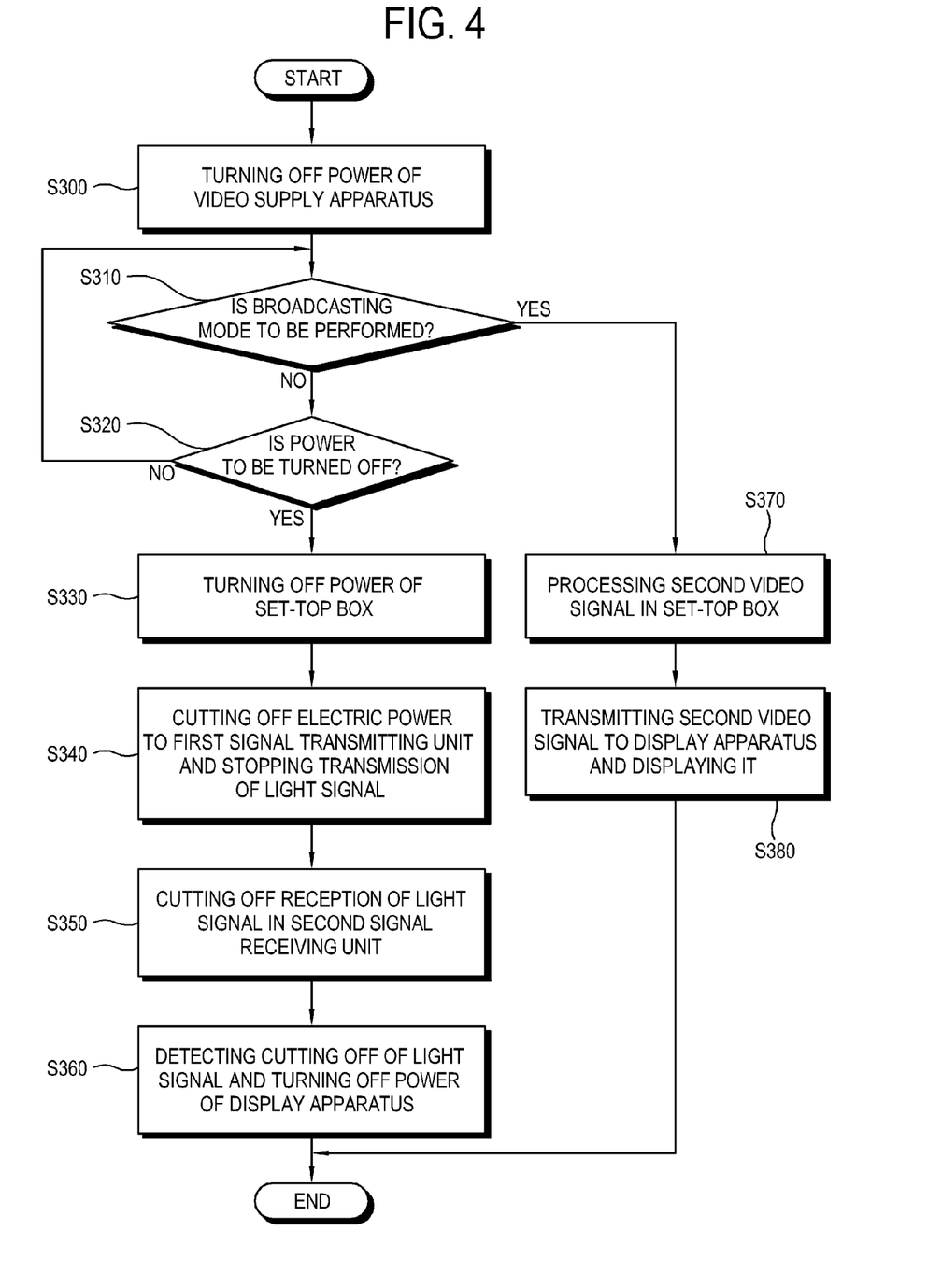
FIG. 4 is a flowchart illustrating a process of controlling operation of a set-top box and a display apparatus according to turning off of power of a video supply apparatus in the video processing apparatus in FIG. 1.

Referring to FIG. 4, the first controller 150 of the set-top box 100 determines that the user turns off the power of the video supply apparatus 300 when the first video signal is not received (S300). The first controller 150 then determines whether to perform the broadcasting mode (S310). If it is determined that the broadcasting mode is not to be performed, it is determined whether to turn off the power of both the set-top box 100 and the display apparatus 200 (S320). As described above, the criterion for the determination of whether to perform the broadcasting mode may be previously selected through the input unit 160 or may be preset in the first controller 150.

If it is determined that the power is to be turned off (S320), the first controller 150 turns off the power of the set-top box 100 (S330).

Accordingly, electric power supply to the first signal transmitting unit 130 is cut off and transmission of the light signal to the display apparatus 200 is stopped (S340). Accordingly, reception of the light signal by the second signal receiving unit 240 is cut off (S350), and the second controller 250 detects the cut-off of the light signal and determines that the power of the set-top box 100 is turned off and turns off the power of the display apparatus 200 (S360).

On the other hand, if it is determined that the broadcasting mode is to be performed (S310), the first controller 150 controls the first video processing unit 120 to process the second video signal received by the set-top box 100 (S370).

Then, if the processed second video signal is transmitted to the display apparatus 200 by the first signal transmitting unit 130, the second controller 250 controls the display unit 210 to display a video corresponding to the second video signal (S380).

In this way, the power states of the set-top box 100 and the display apparatus 200 can be converted in accordance with the conversion of the power state of the video supply apparatus 300. Further, when the power of the video supply apparatus 300 is turned off, the power of both the set-top box 100 and the display apparatus 200 can be turned off, or a video corresponding to a video signal other than the video signal from the video supply apparatus 300 can be displayed.

In the above-described exemplary embodiment, the first signal transmitting unit 130, the second signal receiving unit 240, the second signal transmitting unit 230 and the first signal receiving unit 140 directly transmit and receive the light signal, but there may be a case that one of the video processing apparatuses 100 and 200 can not directly transmit and receive the light signal, which will be described as another exemplary embodiment with reference to FIG. 5.

Figure 5:
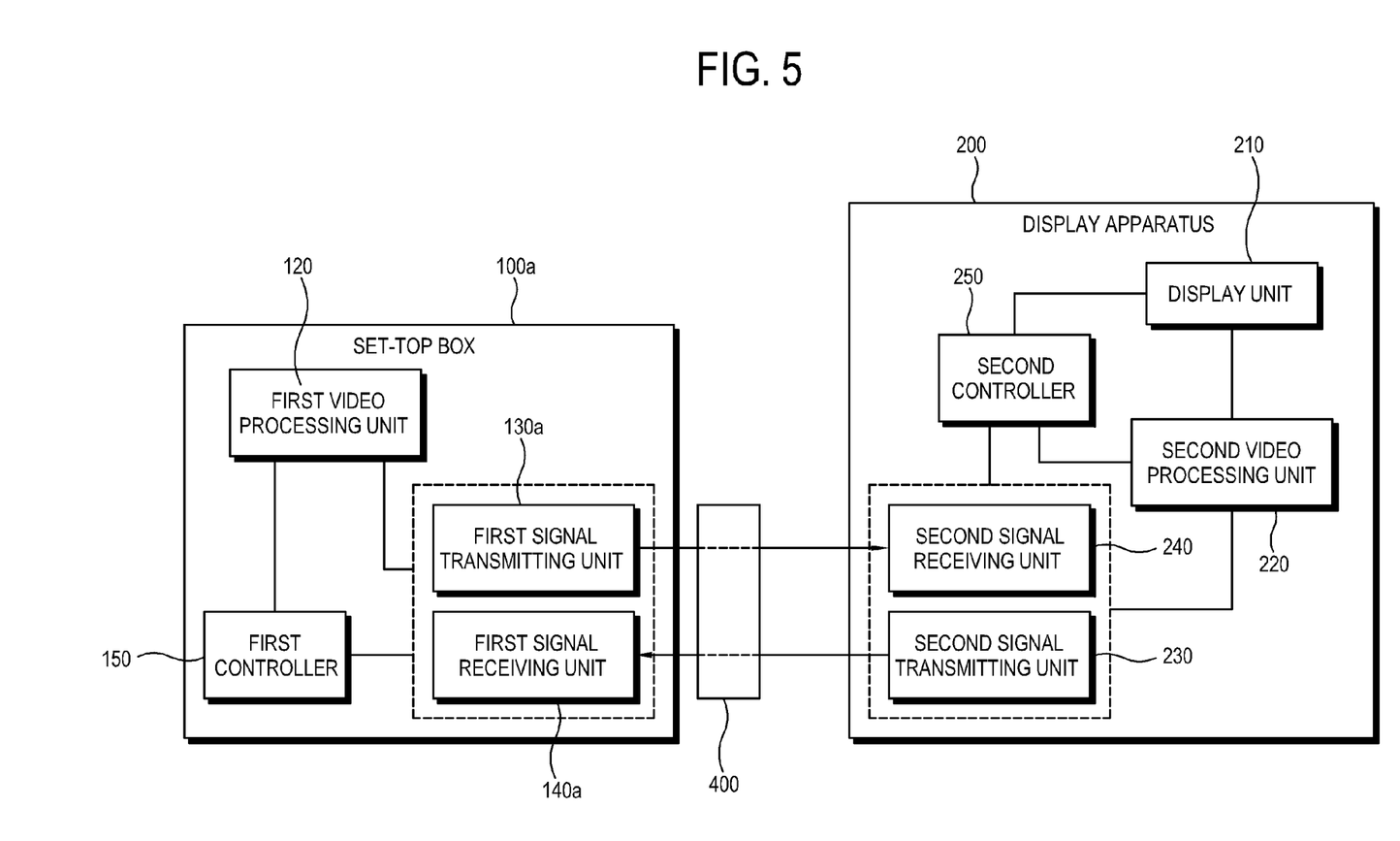
FIG. 5 is a control block diagram illustrating a video processing apparatus according to a second exemplary embodiment of the present invention.

As shown in FIG. 5, according to a second exemplary embodiment of the present invention, a first signal transmitting unit 130a and a first signal receiving unit 140a are included in a set-top box 100a that does not directly transmit and receive a light signal. Accordingly, an interface unit 400 for converting the light signal is provided to transmit and receive the light signal between the second signal receiving unit 240 and the second signal transmitting unit 230, which are included in the display apparatus 200, and the first signal receiving unit 140a and the first signal transmitting unit 130a, which are included the set-top box 100a.

The interface unit 400 converts a signal transmitted from the first signal transmitting unit 130a into a light signal and transmits it to the second signal receiving unit 240 and converts a light signal transmitted from the second signal transmitting unit 230 into a signal having a characteristic which the first signal receiving unit 140a can receive and transmits the converted signal to the first signal receiving unit 140a. The interface unit 400 may be installed in the set-top box 100a or provided separate from the set-top box 100a in the form of a dongle.

In the present embodiment, the interface unit 400 is installed to correspond to the set-top box 100a, but alternatively, the interface unit 400 may be installed to the display apparatus or both the set-top box and the display apparatus.

On the other hand, the case that the display apparatus 200 and a plurality of external devices are provided with respect to one set-top box 100 to transmit and receive the light signal may be considered. In this case, the power of the set-top box 100 may be turned on/off only when the power of the display apparatus 200 is turned on/off Here, the light signal transmitted to the set-top box 100 from the display apparatus 200 includes identification information by which the first controller 150 can identify that the light signal is transmitted from the display apparatus 200. The identification information is generated by the second controller 250 and transmitted to the set-top box 100. The first controller 150 extracts the identification information from the received light signal and determines that the light signal is received from the display apparatus 200.

Because the identification information is not included in the light signal transmitted from the external devices, the power state of the set-top box 100 is not converted even if the power state of the external devices is converted. Further, the first controller 150 controls the power supply to the set-top box 100 according to whether the light signal including the identification information is received or cut off Accordingly, the power state of the set-top box 100 can be converted according to conversion of the power state of the display apparatus 200.

As described above, according to the exemplary embodiments of the present invention, it is possible to synchronize power states of a plurality of video processing apparatuses using a typical video signal or a signal which does not include separate information without using a control signal including the separate information.

Further, it is possible to apply a light signal to a long distance communication between a plurality of video processing apparatuses without distortion.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus comprising:
   a signal receiving unit configured to receive signals from a plurality of external video processing apparatuses, each received signal including identification information for identifying an external video processing apparatus transmitting the signal, among the plurality of external video processing apparatuses;
   a signal transmitting unit configured to transmit another signal to at least one of the plurality of external video processing apparatuses;
   a video processing unit configured to process the signal received in the signal receiving unit; and
   a controller configured to selectively supply or cut off electric power to the video processing unit according to whether the signal receiving unit receives the signal, and to selectively supply or cut off electric power to the signal transmitting unit to control the external video processing apparatus to turn off or on according to whether the signal receiving unit receives the signal,
   wherein, in response to the signal receiving unit not receiving the signal from the external video processing apparatus, the controller cuts off the electric power to the video processing unit and cuts off the electric power to the signal transmitting unit, while maintaining power to the signal receiving unit, to control the external video processing apparatus to turn off, and
   wherein the controller determines whether the signal receiving unit receives the signal from a first apparatus of the plurality of external video processing apparatuses, based on the identification information respectively received from the plurality of external video processing apparatuses, and performs the selectively supplying or cutting off the electric power corresponding to only when receiving the signal from the first apparatus among the plurality of external video processing apparatuses.

2. The video processing apparatus according to claim 1, wherein the controller supplies the electric power to the video processing unit if the signal receiving unit receives the signal and cuts off the electric power to the video processing unit if the signal receiving unit does not receive the signal.

3. The video processing apparatus according to claim 1, wherein the external video processing apparatus is one of a plurality of external video processing apparatuses communicably linked to the video processing apparatus, and if the signal receiving unit receives the signal from the external video processing apparatus of the plurality of external video processing apparatuses, the controller selectively supplies or cuts off the electric power to the video processing unit according to a predetermined selection corresponding to the external video processing apparatus.

4. The video processing apparatus according to claim 3, further comprising an input unit through which the predetermined selection is made by a user.

5. The video processing apparatus according to claim 1, further comprising:
   a display unit which displays video information if the signal includes the video information,
   wherein the controller supplies or cuts off electric power to the display unit according to whether the signal receiving unit receives the signal.

6. The video processing apparatus according to claim 1, wherein the external video processing apparatus is one of a plurality of external video processing apparatuses communicably linked to the video processing apparatus, and if the signal receiving unit receives the signal from the external video processing apparatus of the plurality of external video processing apparatuses, the controller determines whether the signal includes identification information for identifying the external video processing apparatus and selectively supplies or cuts off the electric power to the video processing unit according to a result of the determination of whether the signal includes the identification information for identifying the external video processing apparatus.

7. The video processing apparatus according to claim 1, wherein the signal comprises a light signal.

8. The video processing apparatus according to claim 7, further comprising an interface unit which receives the light signal, converts the light signal into a signal format supported by the signal receiving unit, and transmits the converted signal to the signal receiving unit.

9. A method of controlling supply of power in a video processing apparatus comprising a video processing unit which processes signals received from a plurality of external video processing apparatuses, each signal including identification information for identifying an external video processing apparatus transmitting the signal, and a signal transmitting unit which transmits another signal to at least one of the plurality of external video processing apparatus, the method comprising:
 determining whether a signal is received from an external video processing apparatus, among the plurality of external video processing apparatuses;
 selectively supplying or cutting off electric power to the video processing unit according to a result of the determining whether the signal is received from the external video processing apparatus; and
 selectively supplying or cutting off electric power to the signal transmitting unit to control the external video processing apparatus to turn off or on according to whether the signal is received,
 wherein the selectively supplying or cutting off the electric power to the video processing unit comprises, in response to the signal receiving unit not receiving the signal from the external video processing apparatus, cutting off the electric power to the video processing unit,
 wherein the selectively supplying or cutting off the electric power to the signal transmitting unit comprises, in response to the signal receiving unit not receiving the signal from the external video processing apparatus, cutting off the electric power to the signal transmitting unit, while maintaining power to the signal receiving unit, to control the external video processing apparatus to turn off, and
 wherein the selectively supplying or cutting off the electric power to the signal transmitting unit and to the video processing unit is performed only when determining that the signal is received from the first apparatus, among the plurality of external video processing apparatuses, based on the identification information respectively received from the plurality of external video processing apparatuses.

10. The method according to claim 9, wherein the selectively supplying or cutting off the electric power to the video processing unit comprises:
 supplying the electric power to the video processing unit if it is determined that the signal is received and cutting off the electric power to the video processing unit if it is determined that the signal is not received.

11. The method according to claim 9, wherein the external video processing apparatus is one of a plurality of external video processing apparatuses communicably linked to the video processing apparatus, and the selectively supplying or cutting off the electric power to the video processing unit comprises supplying the electric power to the video processing unit if the signal is received from the external video processing apparatus of the plurality of external video processing apparatuses according to a predetermined selection corresponding to the external video processing apparatus.

12. The method according to claim 9, wherein the selectively supplying or cutting off the electric power to the video processing unit further comprises selectively supplying or cutting off electric power to a display unit of the external video processing apparatus which displays video information included in the signal according to a result of the determining whether the signal is received from the external video processing apparatus.

13. The video processing method according to claim 9, wherein the external video processing apparatus is one of a plurality of external video processing apparatuses communicably linked to the video processing apparatus, and
 wherein the selectively supplying or cutting off the electric power to the video processing unit comprises:
 determining whether the signal includes identification information for identifying the external video processing apparatus of the plurality of video processing apparatuses; and
 selectively supplying or cutting off the electric power to the video processing unit according to a result of the determining whether the signal includes the identification information.

14. The video processing method according to claim 9, wherein the signal comprises a light signal.

* * * * *